United States Patent
Terzini

(10) Patent No.: US 12,473,155 B1
(45) Date of Patent: Nov. 18, 2025

(54) SORTING CONVEYOR MODULE AND ASSEMBLY

(71) Applicant: Tension International, Inc., Kansas City, MO (US)

(72) Inventor: Robert Terzini, Corinth, TX (US)

(73) Assignee: Tension International, Inc., Kansas City, MO (US)

( * ) Notice: Subject to any disclaimer, the term of this patent is extended or adjusted under 35 U.S.C. 154(b) by 804 days.

(21) Appl. No.: 17/811,247

(22) Filed: Jul. 7, 2022

Related U.S. Application Data

(60) Provisional application No. 63/219,140, filed on Jul. 7, 2021.

(51) Int. Cl.
| | |
|---|---|
| *B65G 47/53* | (2006.01) |
| *B07C 3/08* | (2006.01) |
| *B65G 37/02* | (2006.01) |
| *B65G 41/00* | (2006.01) |
| *B65G 43/08* | (2006.01) |
| *B65G 47/64* | (2006.01) |

(52) U.S. Cl.
CPC ............... *B65G 47/53* (2013.01); *B07C 3/08* (2013.01); *B65G 37/02* (2013.01); *B65G 41/002* (2013.01); *B65G 43/08* (2013.01); *B65G 47/647* (2013.01); *B65G 2203/0216* (2013.01); *B65G 2203/0233* (2013.01); *B65G 2207/30* (2013.01)

(58) Field of Classification Search
CPC ...... B65G 47/53; B65G 37/02; B65G 41/002; B65G 43/08; B07C 3/08
See application file for complete search history.

(56) References Cited

U.S. PATENT DOCUMENTS

| | | | | |
|---|---|---|---|---|
| 6,005,211 | A * | 12/1999 | Huang | ...................... B07C 3/08 209/939 |
| 7,918,402 | B2 | 4/2011 | Conlon et al. | |
| 10,669,098 | B1 | 6/2020 | Terzini et al. | |
| 10,835,928 | B2 * | 11/2020 | Bellar | ...................... B07C 5/367 |
| 11,345,547 | B1 | 5/2022 | Terzini et al. | |
| 2001/0030102 | A1 * | 10/2001 | Woltjer | .............. B65G 47/1492 198/388 |
| 2002/0084173 | A1 * | 7/2002 | Paquette | ................ B65G 43/10 198/781.06 |
| 2003/0075416 | A1 * | 4/2003 | Prutu | ........................ B07C 5/34 198/370.1 |
| 2014/0277698 | A1 * | 9/2014 | Combs | ............... G05B 19/4189 198/460.1 |

(Continued)

*Primary Examiner* — Kyle O Logan
(74) *Attorney, Agent, or Firm* — AVEK IP, LLC; Kent R. Erickson

(57) ABSTRACT

A conveyor module, a plurality of which is configured to transport and sort an input stream of packages into a plurality of output streams. The conveyor module includes an infinite belt and a pair of presence sensors that detect the presence of a package on the belt. The conveyor module can be combined with a plurality of like modules in a parallel or orthogonal alignment and controlled independently to bi-directionally move packages longitudinally or transversely toward a desired output stream and to sort an input stream of packages among a plurality of output streams. Any number of conveyor modules may be combined to provide a desired number of output streams and to accommodate desired dimensions of a package transport and sorting system.

19 Claims, 17 Drawing Sheets

(56) References Cited

U.S. PATENT DOCUMENTS

| | | | |
|---|---|---|---|
| 2015/0001137 A1* | 1/2015 | Layne | B65G 37/00 |
| | | | 209/552 |
| 2015/0151921 A1* | 6/2015 | Collot | B65G 43/00 |
| | | | 700/230 |
| 2020/0130939 A1* | 4/2020 | Davies | B65G 21/12 |
| 2020/0254490 A1* | 8/2020 | Lundahl | B07C 3/14 |
| 2020/0346867 A1* | 11/2020 | Kim | B65G 47/53 |
| 2021/0362194 A1* | 11/2021 | Lundahl | B07C 3/14 |
| 2024/0067458 A1* | 2/2024 | Umino | B65G 43/08 |

* cited by examiner

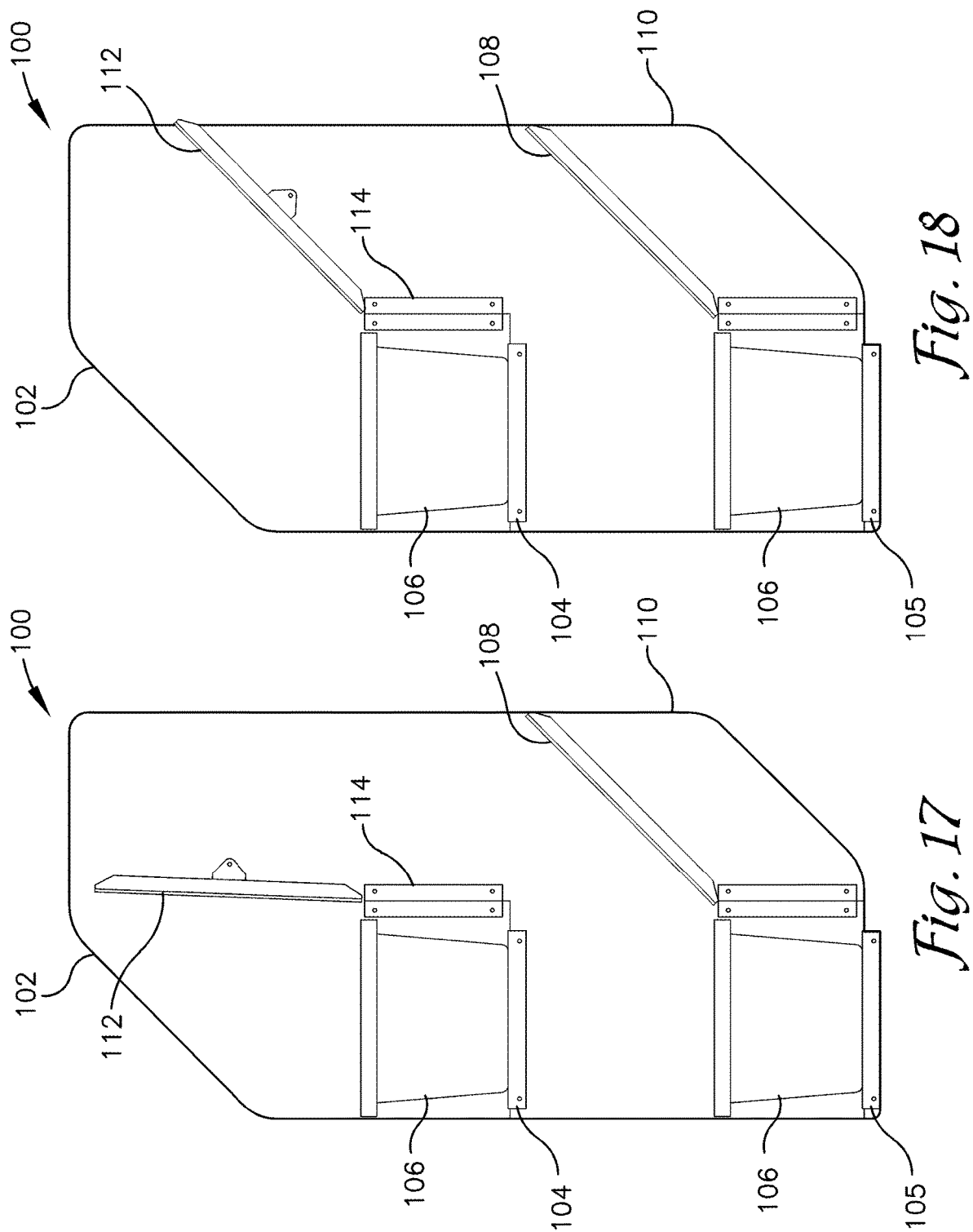

SORTING CONVEYOR MODULE AND ASSEMBLY

CROSS-REFERENCE TO RELATED APPLICATIONS

This application claims the benefit of U.S. Provisional Application No. 63/219,140, filed Jul. 7, 2022, the disclosure of which is hereby incorporated herein in its entirety by reference.

BACKGROUND

Warehouse and shipping facilities move and route many thousands of packages into, through, and out of the facilities every day. Often packages having different destinations within or beyond the facility are intermingled on a conveyor or conveyance system and must be separated for transport to those particular destinations. Many systems including robotics, multidirectional conveyors, and manual separation by operators have been developed that are useable to separate such intermingled packages. However, such available systems can be complex and expensive to implement and operate and require configurations that are unique to each implementation. What is needed is a simple modular sorting system that is adaptable to the requirements of many conveyance systems and that can sort a stream of intermingled packages into a plurality of destination streams.

SUMMARY

A high-level overview of various aspects of exemplary embodiments is provided here to introduce a selection of concepts that are further described in the Detailed-Description section below. This summary is not intended to identify key features or essential features of embodiments, nor is it intended to be used in isolation to determine the scope of the described subject matter. In brief, this disclosure describes a conveyor module and assembly thereof configured to sort an input stream of packages into a plurality of destination or output streams.

The conveyor module comprises an infinite belt stretched between and extending around a drive roller and a driven roller and a pair of presence sensors configured to detect packages advancing onto or exiting the belt or both. The belt is moved by the drive roller which is selectively operable to advance the upper run of the belt in either direction to advance a package supported on the upper run of the belt either toward and past a first end of the conveyor module or toward and past a second end of the conveyor module to advance a package supported on the upper run onto an adjacent conveyor module or to a collector or collection station corresponding to a selected destination for selected packages. At least the second end of the conveyor module is positionable so that the upper run at the second end extends above or higher than at least a portion of the upper run of an adjacent conveyor module. The conveyor module may be angled upward so that the upper run of the belt at the second end extends at an upward angle to move a package supported thereon upward from the receiving-end toward the transfer-end.

A first of the presence sensors is disposed near the first end of the belt and detects a package either entering onto or advancing off of the belt at the first end. A second of the presence sensors is spaced inward a distance from the second or transfer-end of the belt and detects a package advancing off of the belt at the second end. The second presence sensor may also be used to detect that the package is positioned on the belt near the second or transfer-end of the belt.

A plurality of the conveyor modules may be disposed end-to-end to move packages longitudinally in a direction parallel to the belts. Or the conveyor modules may be disposed orthogonally to one another to enable movement of packages transversely or side-to-side relative to the longitudinal direction. The conveyor modules can thus be arranged to transfer packages from one conveyor module to another and from a conveyor module to a sort location which may be in the form of receiver such as a tote or container or to a subsequent conveyance system. Using bidirectional drive capabilities of the conveyor modules, the packages can be directed in one of two directions based on a desired sort location or receiver for the package. Any number of conveyor modules can be employed to provide any desired number of possible sorting locations or endpoints for a stream of packages.

The conveyor modules can be arranged to form a conveyance system to facilitate a method for sorting parcels on the conveyance system for delivery to selected locations. The method comprises arranging a plurality of conveyor modules including bidirectional conveyors such that the bidirectional conveyors of at least some of the conveyor modules are oriented transversely relative to bidirectional conveyors of other conveyor modules of the plurality of conveyor modules to form a conveyance system having a plurality of endpoints. The endpoints corresponding to destination indicia. A plurality of parcels having destination indicia thereon are successively advanced individually onto a first conveyor module of the conveyance system. The destination indicia on each parcel advanced onto the first conveyor module is scanned. Each parcel is then successively advanced from the first conveyor module to successively adjacent conveyor modules until the parcel reaches a designated endpoint corresponding to the destination indicia on the respective parcel or an endpoint corresponding to none of the destination indicia on the plurality of parcels. As one of the parcels of the plurality of parcels is advanced off of a downstream conveyor module another parcel of the plurality of parcels on a prior adjacent conveyor module is advanced onto the downstream conveyor module. Each of the plurality of conveyor modules is configured to accommodate one of the plurality of parcels at any one time.

DESCRIPTION OF THE DRAWINGS

Illustrative embodiments are described in detail below with reference to the attached drawing figures, and wherein:

FIG. 17 is a side elevational view of a tote-sorting apparatus with a side panel removed to reveal interior features of the apparatus depicted in accordance with an exemplary embodiment; and FIG. 18 is a side elevational view of the tote-sorting apparatus of FIG. 17 with a diversion panel pivoted to direct packages into an upper tote depicted in accordance with an exemplary embodiment.

DETAILED DESCRIPTION

The subject matter of select exemplary embodiments is described with specificity herein to meet statutory requirements. But the description itself is not intended to necessarily limit the scope of embodiments. Rather, the subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" or "substantially" as used herein denote deviations from the exact value by +/−10%, preferably by +/−5% and/or deviations in the form of changes that are insignificant to the function.

Figure 1:
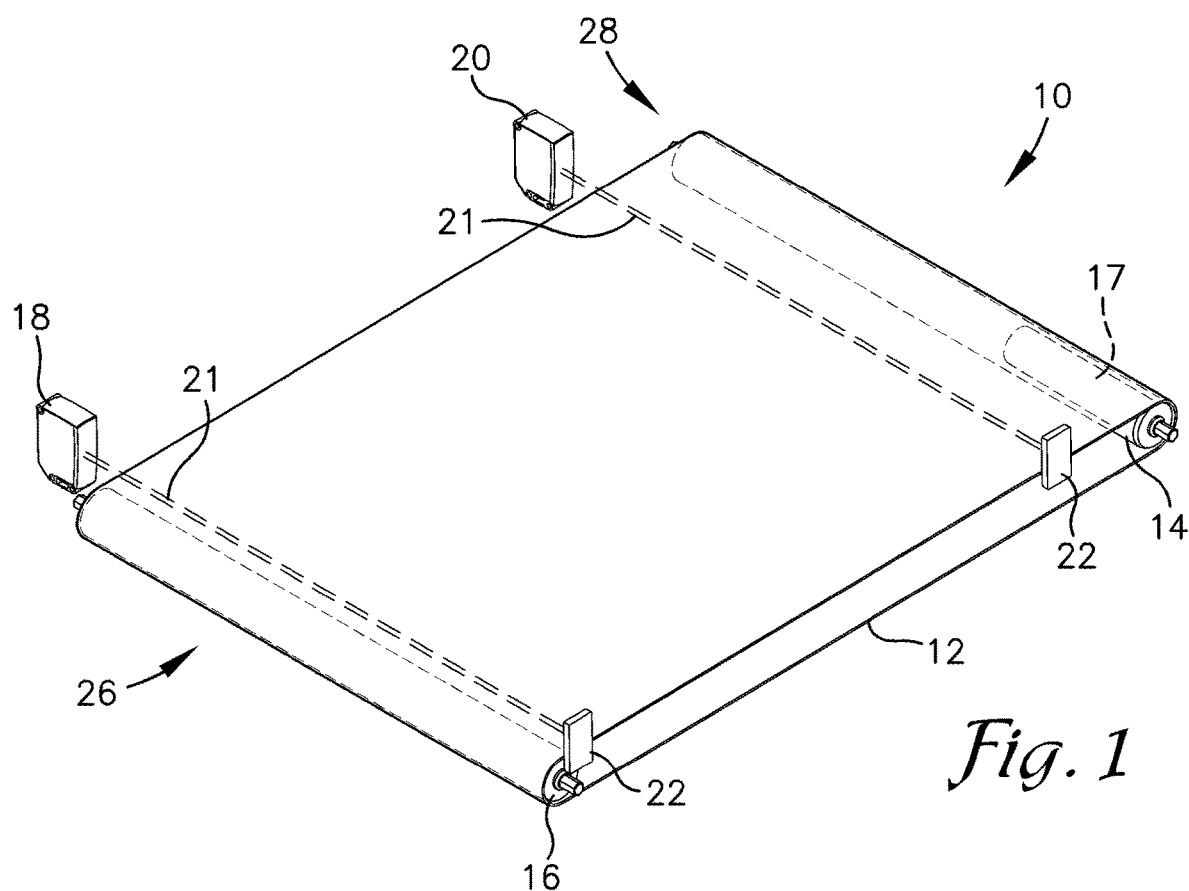
FIG. 1 is a perspective view of a conveyor module depicted in accordance with an exemplary embodiment.
Figure 14:
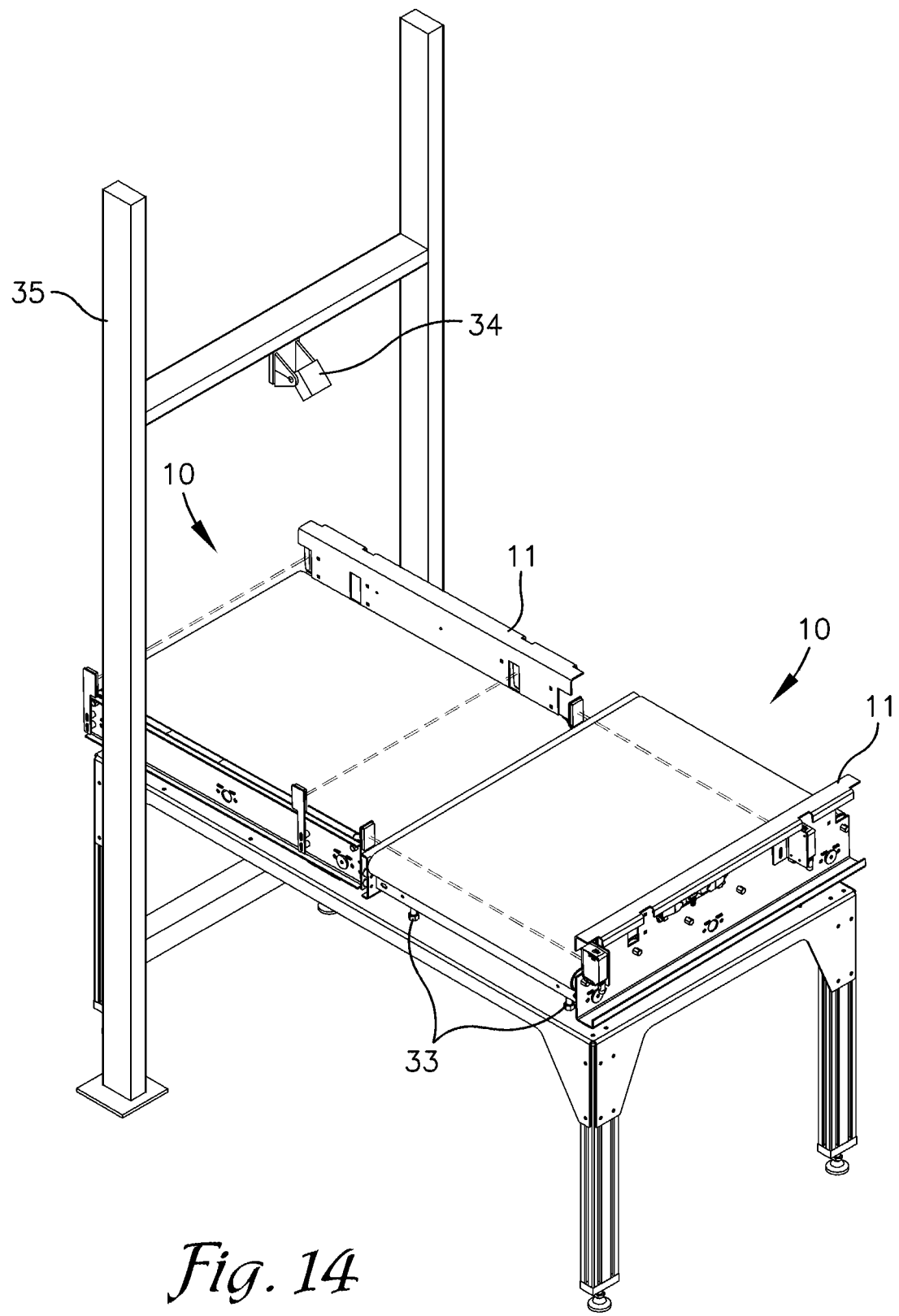
FIG. 14 is a perspective view of two of the conveyor modules of FIG. 1 positioned transversely on a frame structure with a scanner positioned to scan indicia on packages on a first of the conveyor modules in accordance with an exemplary embodiment.

With reference to FIG. 1, a conveyor module 10 is described in accordance with an exemplary embodiment. As shown in FIG. 14, the conveyor module 10 includes a frame structure 11 on which the components described herein may be mounted. The conveyor module 10 comprises an infinite belt 12 that is disposed to operatively extend between and around a drive roller 14 and a driven roller 16 which are rotatably mounted on the frame 11 as is well known in conveyor systems. The drive roller 14 is shown operatively coupled at a second end of the frame structure 11 and to a drive means such as an electric motor 17. In the embodiment shown, the drive motors 17 are mounted within the drive roller 14, and may also be referred to as a motor driven roller. One example of a motor driven roller is Pulseroller's Senergy Motorized Drive Roller. The drive means might also comprise mechanically-, hydraulically-, or pneumatically driven motors or systems among others that may employ chains, belts, gears or the like to produce rotational motion of the drive roller 14. The driven roller 16 is coupled to a first end of the frame structure 11 and is freely rotatable about a long axis of the driven roller 16. In one embodiment, the driven roller 16 is at least partially driven by the same or different drive means as the drive roller 14. Although depicted in particular positions in FIG. 1, it is understood that the positions of drive roller 14 and the driven roller 16 may be interchangeable.

The conveyor module 10 is dimensioned with a longitudinal length to provide sufficient distance between the drive roller 14 and the driven roller 16 for individual items transported on the belt 12 to be fully positioned therebetween. Similarly, the conveyor module 10 preferably has a width or transverse dimension that is generally greater than that of items to be transported thereon. Preferably only a single item is disposed on the conveyor module 10 at any given time, but in some embodiments more than one item may be disposed on the conveyor module 10.

An first end presence sensor 18 and a second end presence sensor 20 are disposed on the conveyor module 10. The sensors 18, 20 preferably comprise photoelectric sensors that detect obstruction of light beams by a package 24 passing through a beam 21 transmitted in closely spaced relation above and across an upper run 25 of the belt 12 between the drive roller 14 and driven roller 16. For example, the sensors might comprise WTB26 model photoelectric sensors from SICK Product & Competence Center Americas, LLC of Minneapolis, Minnesota. Such sensors may also include a reflector 22 or receiver mounted on an opposite side of the belt 12 that reflects or receives a beam of light or other signal 21 from the sensor 18, 20 or emitter. Alternatively, a variety of other sensor types including ultrasonic, capacitive, or the like may be employed.

Figure 2:
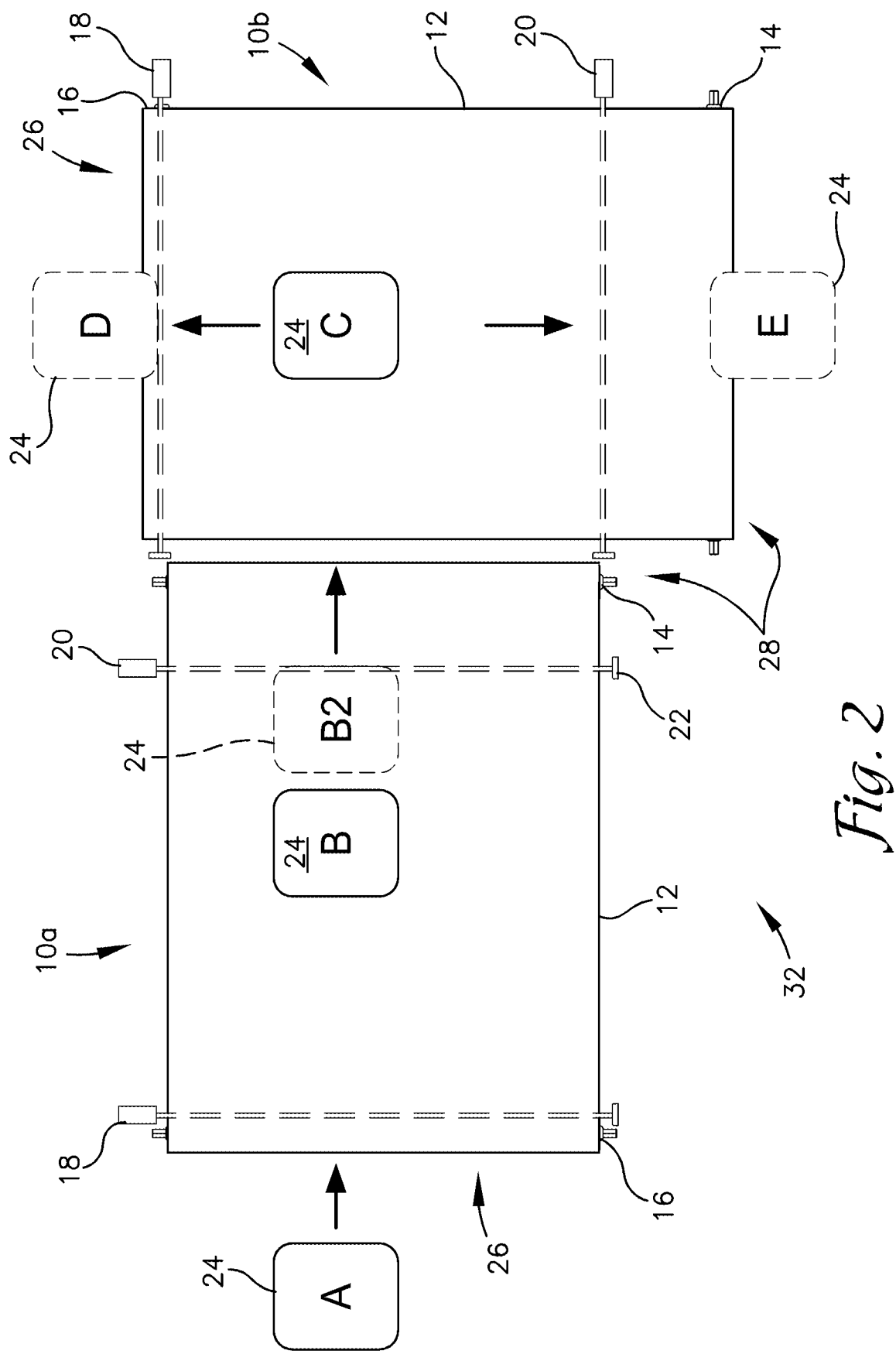
FIG. 2 is a top plan view of two of the conveyor modules of FIG. 1 aligned orthogonally to one another and showing movement of a package there along.

The first end sensor 18 is shown positioned or located adjacent to or generally in-line with the driven roller 16 and may be configured to detect a package 24 entering onto the conveyor module 10 from an first end 26 thereof, as depicted in FIG. 2 at position A. The first end sensor 18 may also be employed to determine when the package 24 is fully transferred onto the belt 12 of the conveyor module 10, such as shown at position B. For example, when the light beam 21 of the sensor 18 is broken, the presence of the package 24 and its entry onto the conveyor module 10 is detected and when the beam 21 is re-established, the positioning of the full package 24 on the conveyor module 10 is recognized. The first end sensor 18 may also be employed to determine when a package 24 advances off the upper run 25 of the belt 12, past the first end 26 of the conveyor module 10 and into a sort location 30. For example, when the light beam 21 of the sensor 18 is broken, the presence of the package 24 and advancement of the package 24 toward the first end of the conveyor module 10 is detected and when the beam 21 is re-established, the advancement of the full package 24 off the conveyor module 10 is recognized.

The second-end sensor 20 is positioned spaced longitudinally inward from the drive roller 14 and thus spaced apart or inward from a second end 28 of the conveyor module 10. As such, the presence of the package 24 in a position that is spaced inward from the exit end 28 of the conveyor module 10 can be recognized. The second-end sensor 20 may be employed to determine when a package 24 advances off the upper run 25 of the belt 12, past the second end 28 of the conveyor module 10 and onto the upper run 25 of the belt 12 of an adjacent conveyor or into a sort location 30. For example, when the beam 21 of the second-end sensor 20 is broken, the presence of the package 24 and advancement of the package 24 toward the second end of the conveyor module 10 is detected and when the beam 21 is re-established, the complete advancement of the package 24 past the second end 28 of the conveyor module 10 and either on to the adjacent conveyor module 10 or into a sort location 30 is recognized.

Figure 3:
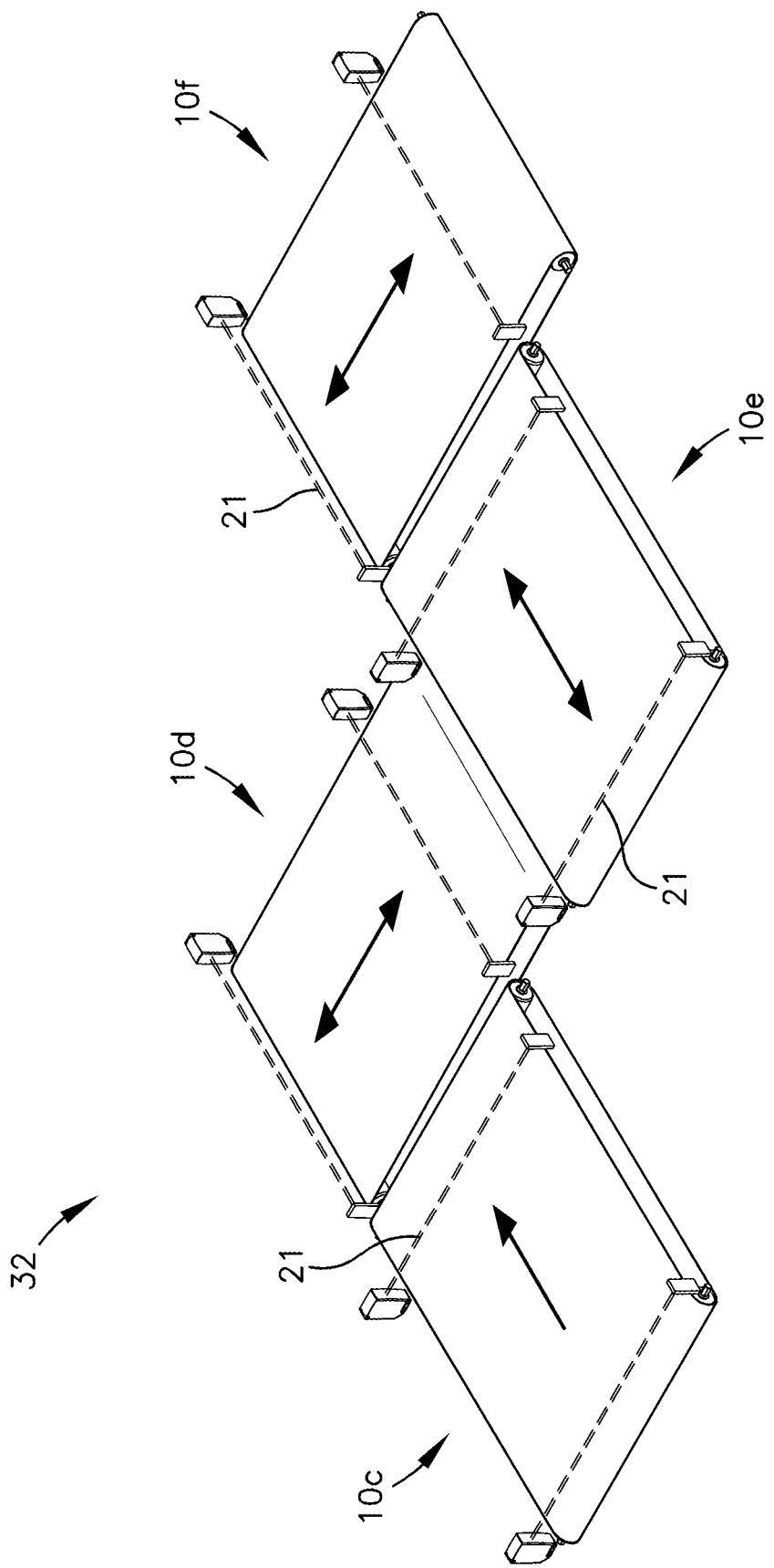
FIG. 3 is a perspective view of four of the conveyor modules of FIG. 1 arranged to provide four sorting locations (shown diagrammatically in FIG. 4) in accordance with an exemplary embodiment.
Figure 4:
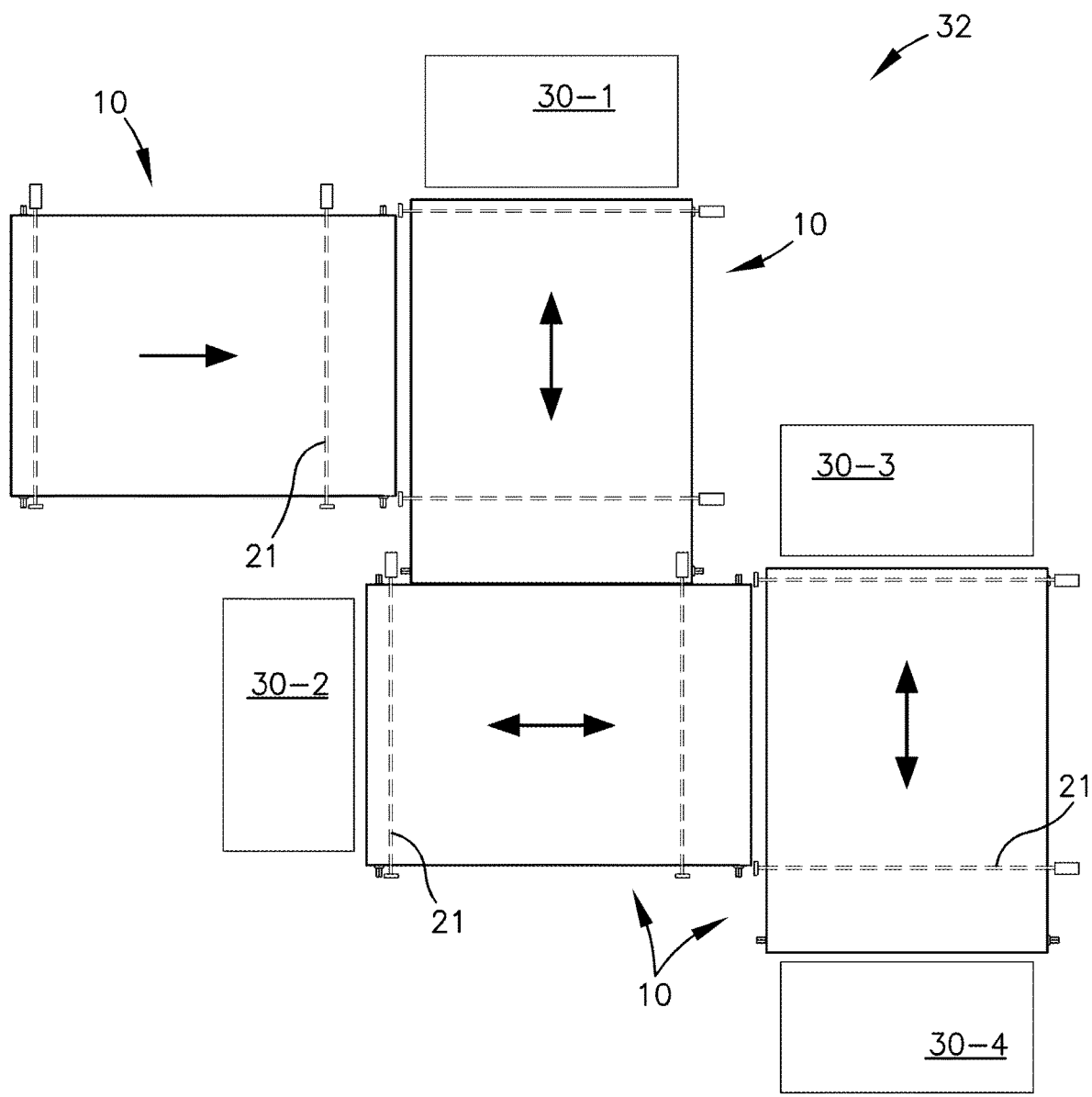
FIG. 4 is a top plan view of the configuration depicted in FIG. 3 showing the sorting locations diagrammatically.
Figure 5:
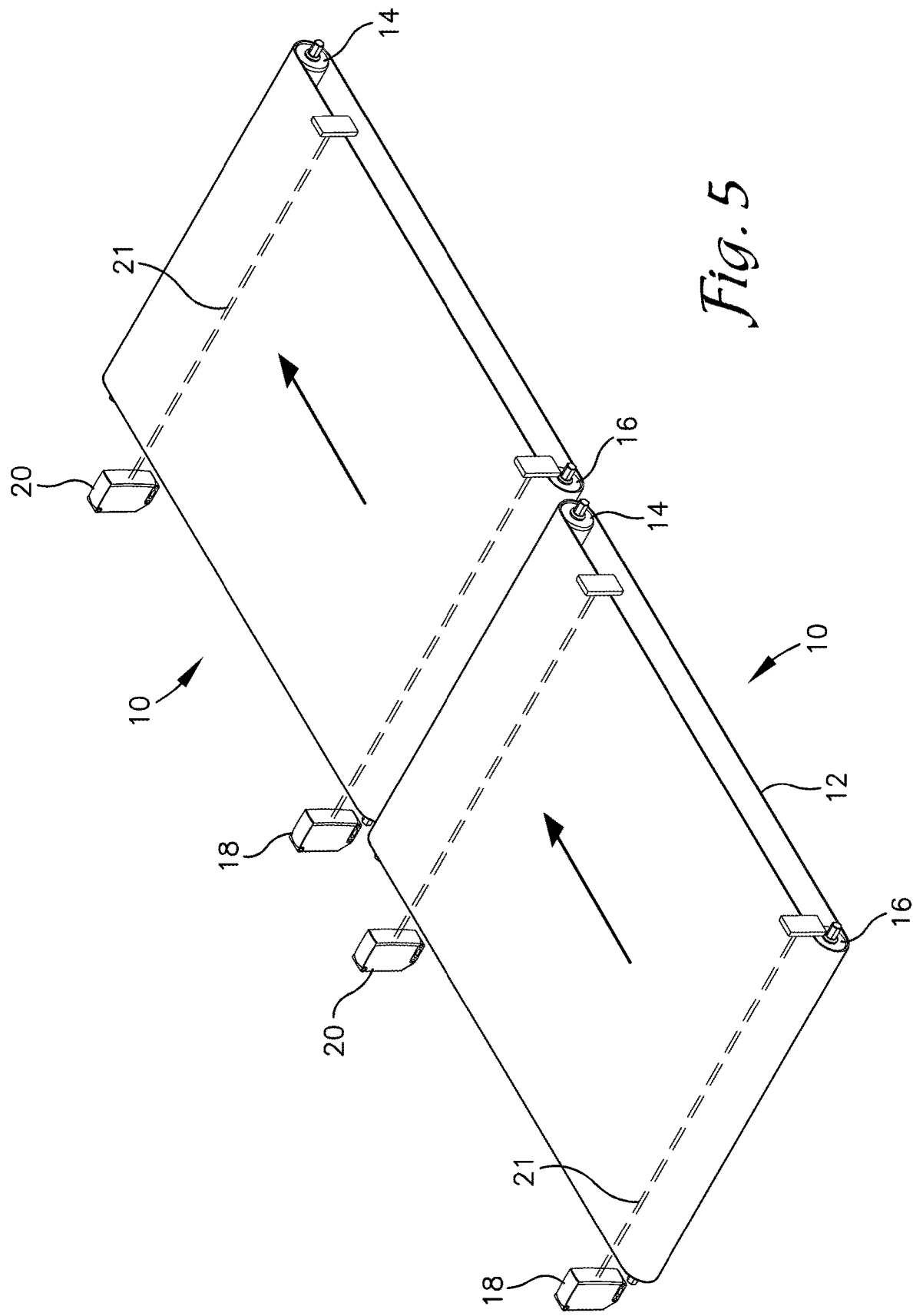
FIG. 5 is a perspective view of two of the conveyor modules of FIG. 1 aligned longitudinally in accordance with an exemplary embodiment.
Figure 6:
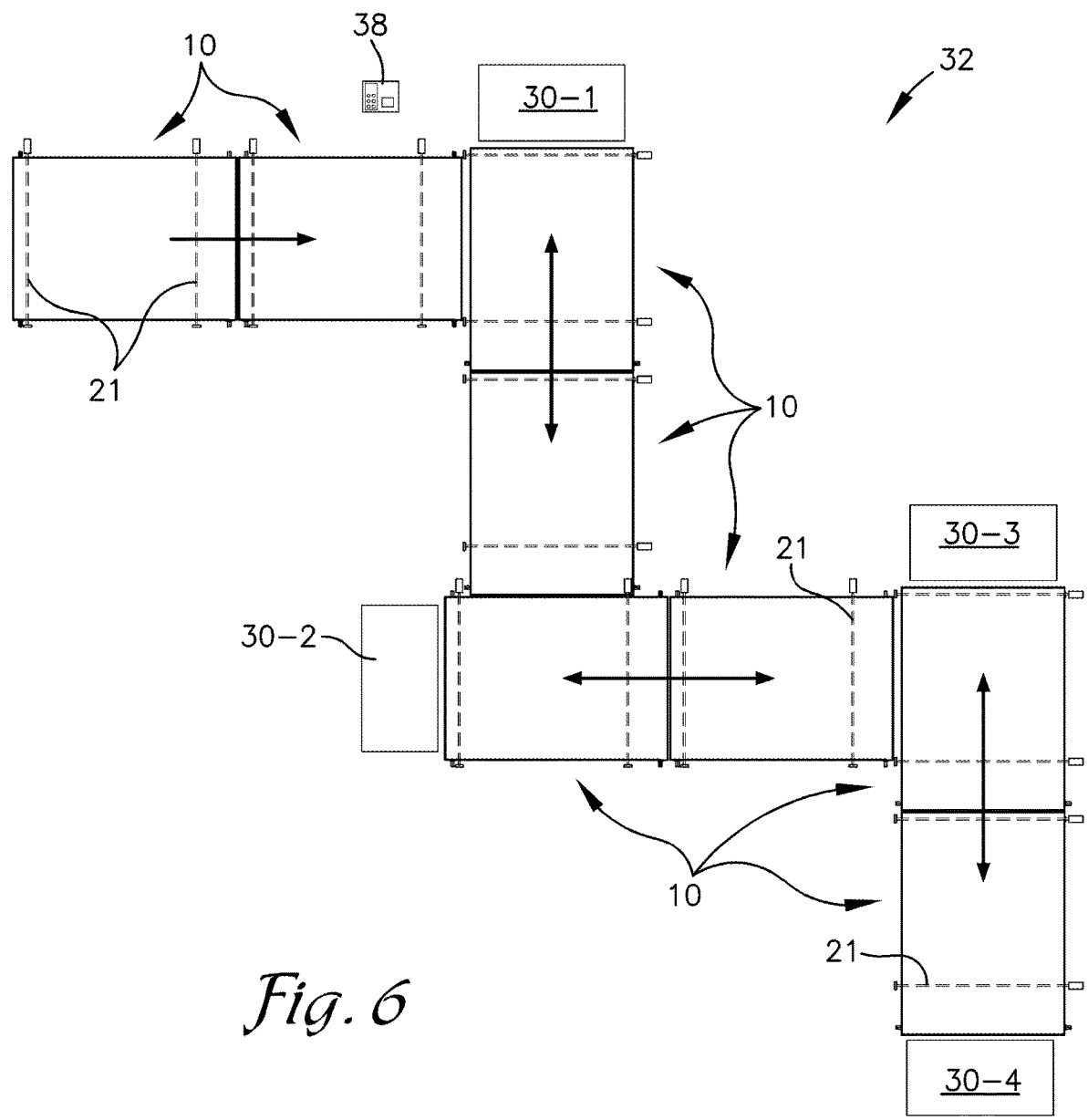
FIG. 6 is a top plan view of a plurality of the conveyor modules of FIG. 1 arranged end-to-end and orthogonally to one another to provide four large sorting locations depicted diagrammatically in accordance with an exemplary embodiment.

With additional reference now to FIGS. 3-12, operation of the conveyor module 10 is described in accordance with an exemplary embodiment. Although an exemplary embodiment includes the conveyor module 10 as a single, standalone unit, applications thereof are generally comprised of a plurality of the conveyor modules 10 combined together to form a conveyance system 32. As depicted in FIG. 2, two conveyor modules 10 can be positioned with a first of the conveyor modules 10a directed longitudinally and a second conveyor module 10b positioned transversely or orthogonally relative to the first conveyor module 10a. Alternatively, the conveyor modules 10 may be aligned longitudinally, end-to-end as depicted in FIG. 5. Various combinations of these two arrangements (transverse and longitudinally aligned) may be combined to form a desired path or paths of a conveyance system 32 formed by the conveyor modules 10 and to provide any number of sort locations or endpoints 30 of those paths. For example, FIGS. 3 and 4 depict four conveyor modules 10 arranged transversely to one another and providing four sort locations or endpoints 30; FIG. 6 depicts eight conveyor modules 10 arranged in pairs with each conveyor module 10 in each pair being aligned longitudinally and each pair being aligned transversely to the next pair in the path; and FIGS. 7-10 depict pluralities of conveyor modules 10 in various arrangements that form multiple paths and endpoints 30.

Figure 11:
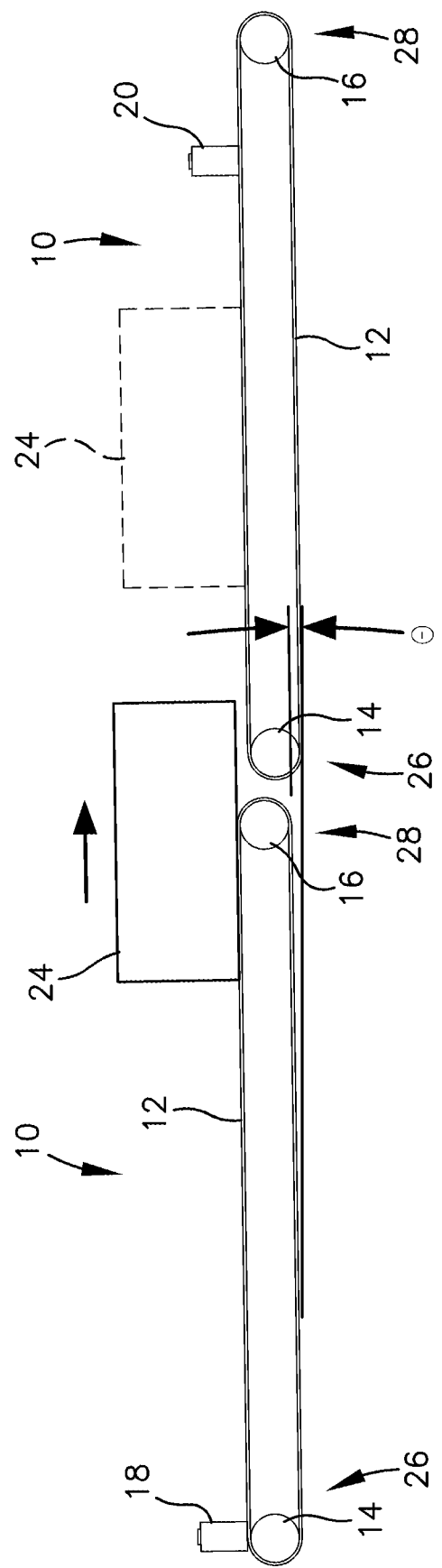
FIG. 11 is a side elevational view of two of the conveyor modules of FIG. 1 positioned end-to-end and showing a sloped orientation of the conveyor modules depicted in accordance with an exemplary embodiment.

With reference to FIGS. 11, in some embodiments having a first conveyor module 10a aligned longitudinally with a second conveyor module 10b, the first conveyor module 10a may be positioned with the upper run 25 of the belt of first conveyor module 10a at the second end 28 thereof spaced vertically above the upper run 25 of the belt 12 of the second or next conveyor module 10b in the path at the first or entry end 26 thereof. As depicted in FIGS. 11, the drive roller 14 may be elevated above a horizontal plane of the driven roller 16 such that the upper run 25 of the belt 12 extends at an upward angle, θ, relative to the horizontal from the driven roller 16 to the drive roller 14 to provide the vertical spacing. The upward angle, θ, is preferably between about 0° and about 45° or between about 2° and about 15° or about 5°. In one embodiment, the drive roller 14 and/or the driven roller 16 may be adjustable to adjust the angle θ. In another embodiment, the belt 12 of the conveyor modules 10a and 10b may be positioned horizontally with the conveyor module 10a positioned vertically above the subsequent conveyor module 10b to provide the desired vertical spacing, or a combination of both elevated and angled configurations. In one embodiment, the height of each end of each conveyor module 10 is vertically adjustable by means of threaded feet 33 at the base of the conveyor module 10 supported on the frame structure 11. Vertical and angular adjustment may be accomplished prior to the start up of the conveyance system 32. In another embodiment, adjustment is actuated by an actuator, and vertical and angular adjustment may be made during operation of the conveyance system 32.

Figure 12:
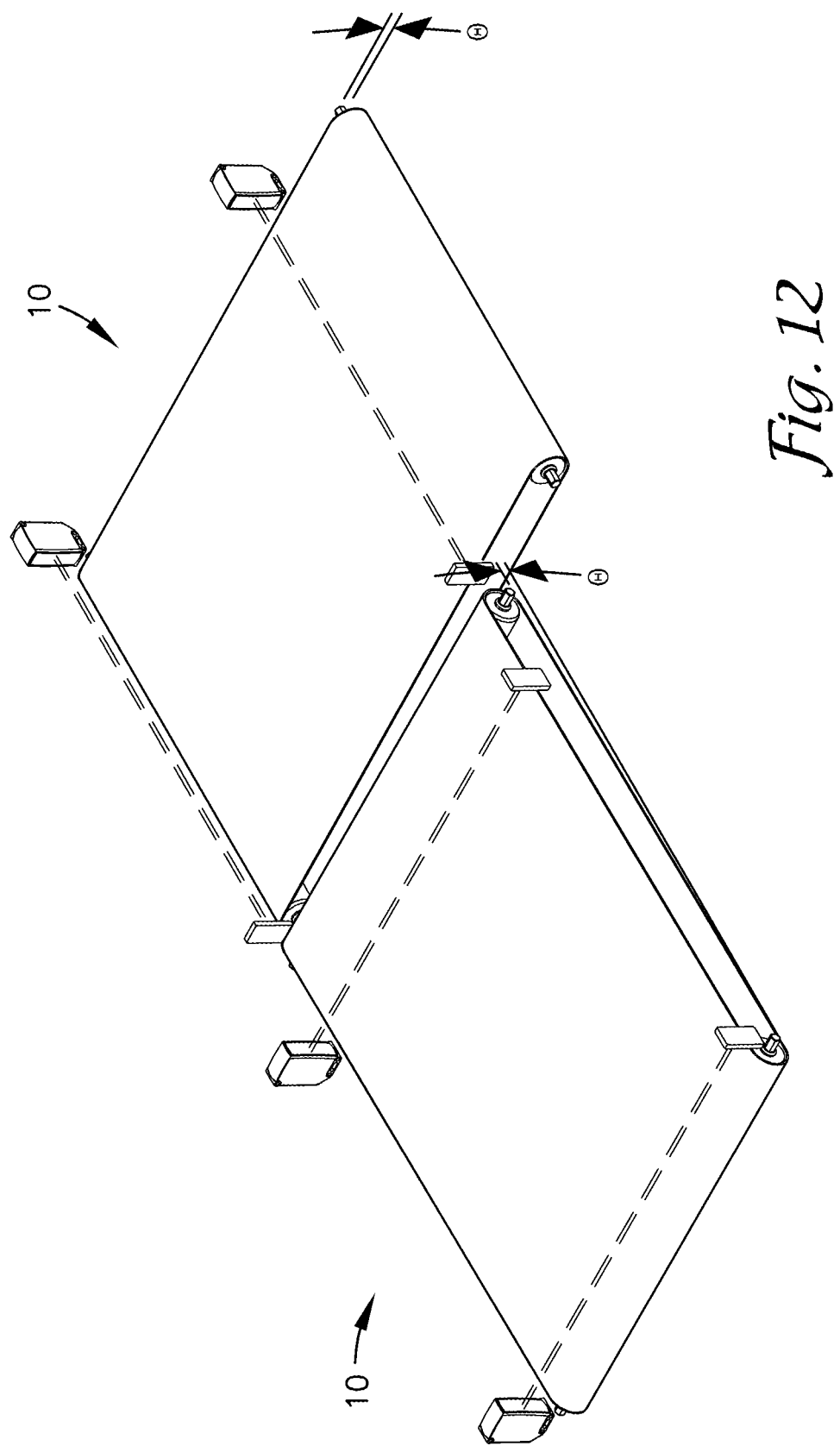
FIG. 12 is a perspective view of two of the conveyor modules of FIG. 1 positioned orthogonally to one another and depicting a sloped orientation of the conveyor modules in accordance with an exemplary embodiment.
Figure 13:
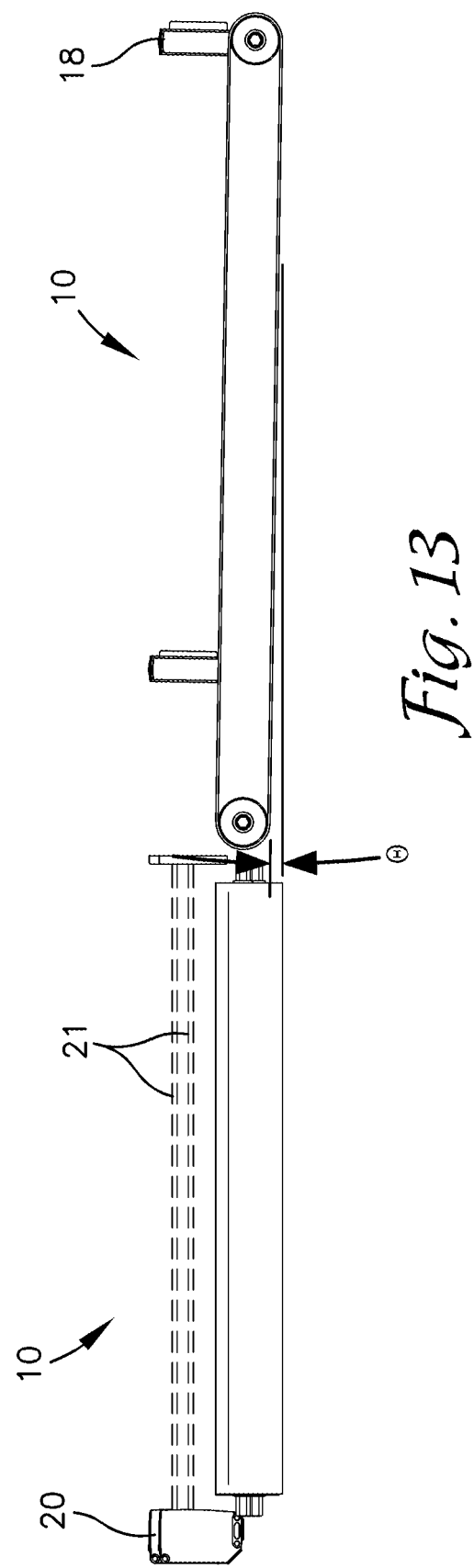
FIG. 13 is a left side elevational view of the two conveyor modules of FIG. 12 showing the sloped orientation of the conveyor modules.

With reference to the orthogonally aligned conveyor modules 10a and 10b, shown in FIGS. 12 and 13, each of the conveyor modules 10a and 10b is supported in an angular orientation with an upper run 25 of the belt 12 of each conveyor module 10a and 10b sloping upward from a first end 26 to a second end 28 of the module 10a and 10b. The upper run of the first or longitudinally aligned conveyor module 10a at the second end 28 thereof, extends above the upper run 25 of the belt 12 of the orthogonally oriented second conveyor module 10b from a first side of the first conveyor module 10a aligned with the first end 26 of the orthogonally oriented conveyor module 10b to a second side of the first conveyor module 10a generally aligned with the second position sensor 20.

Figure 15:
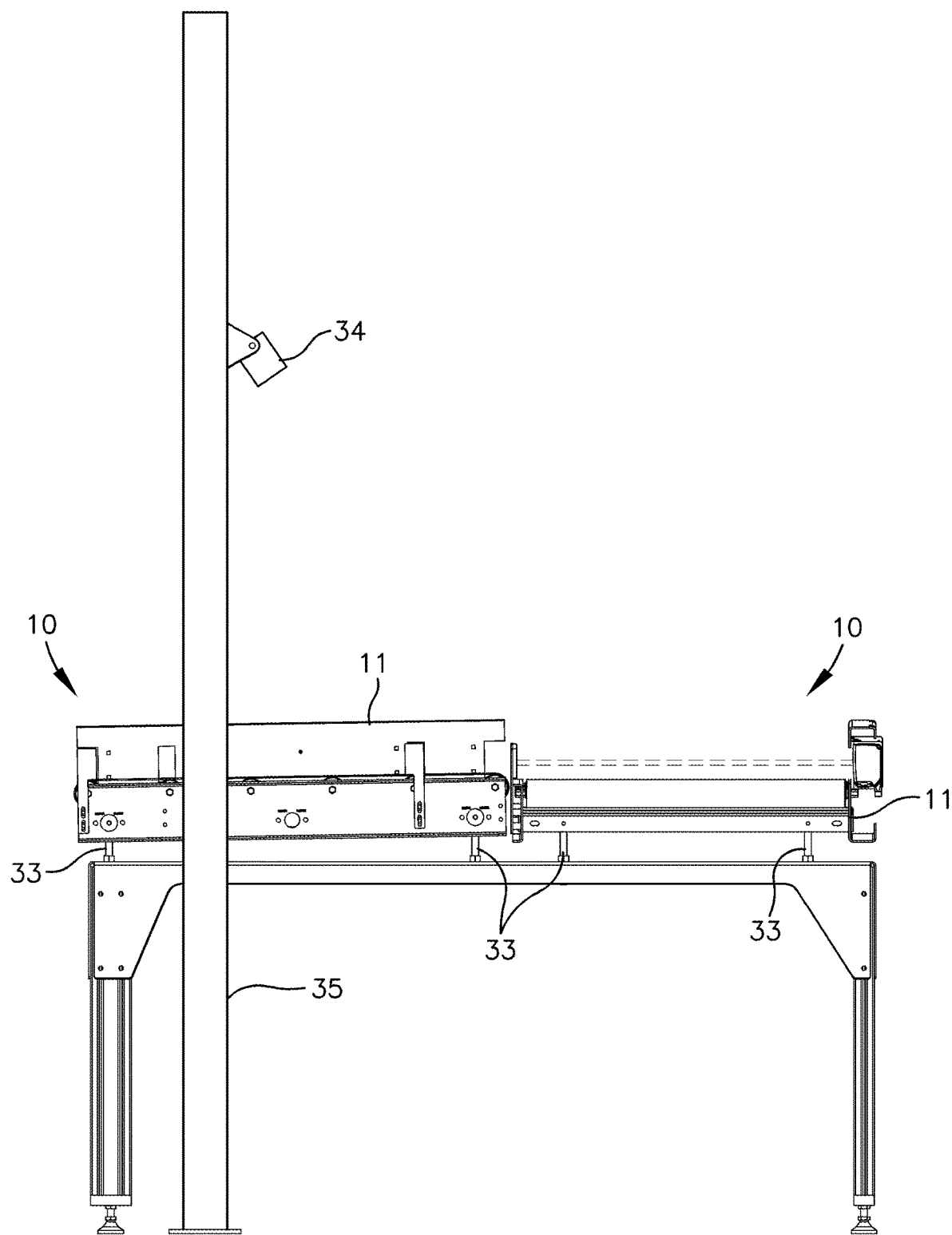
FIG. 15 is a side elevational view of the two conveyor modules and scanner positioned on the frame structure showing an angular orientation of the conveyor modules.
Figure 16:
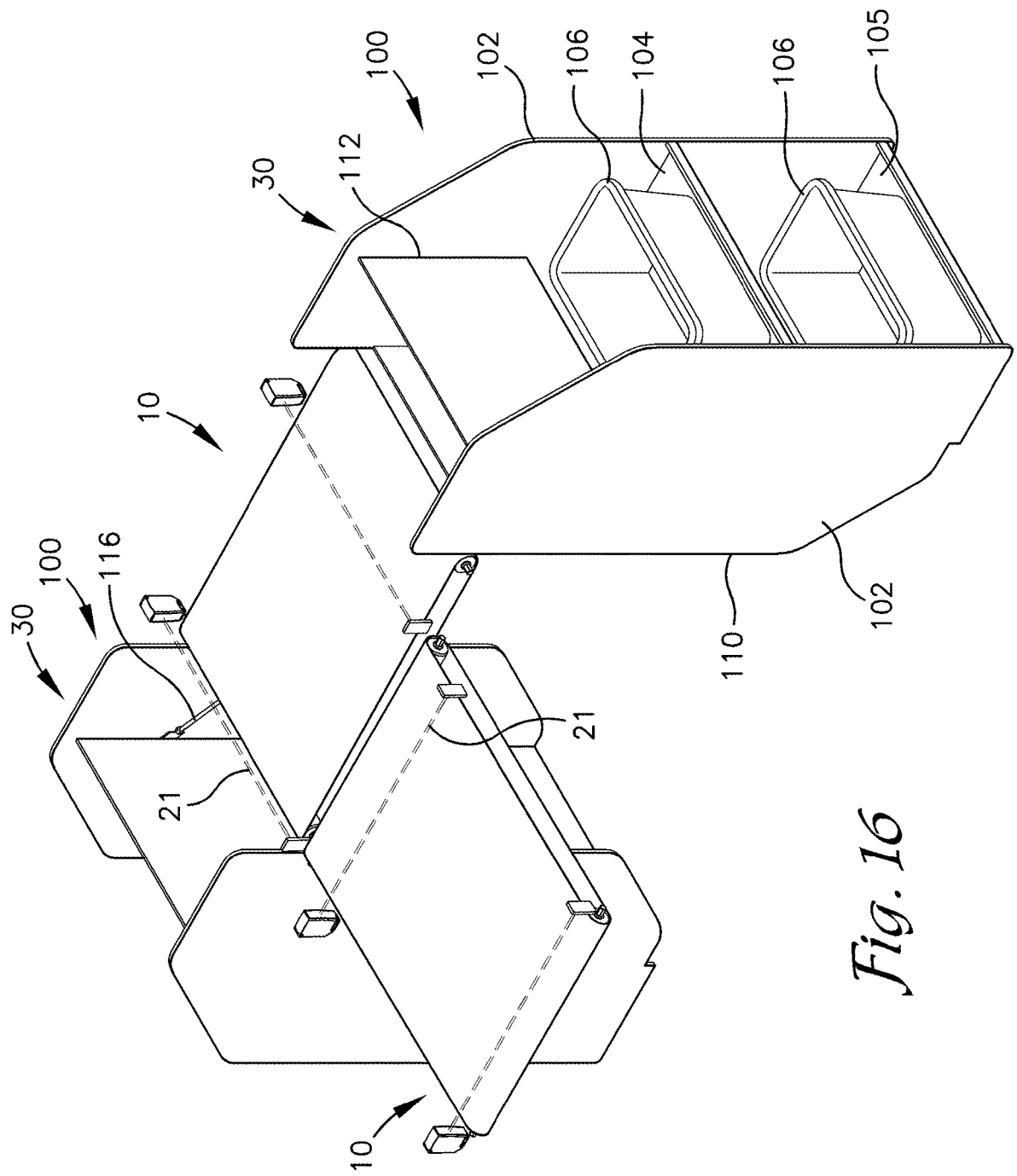
FIG. 16 is a perspective view of two of the conveyor modules of FIG. 1 feeding a pair of tote-sorting apparatus depicted in accordance with an exemplary embodiment.

With reference to FIGS. 14 and 15, the selectively configurable conveyance systems 32 formed from the conveyor modules 10 disclosed herein, may include a scanner, reader, or other detection device 34 positioned to scan an indicium, such as a bar code, QR code, or similar identifier on the package 24 prior to or after entry onto any one or more of the conveyor modules 10. FIGS. 14 and 15 show the scanner 34 mounted on a frame or a stand 35 which positions the scanner 34 over a conveyor module 10. Preferably, the scanner 34 is positioned to read the indicia subsequent to entry onto the first conveyor module 10 (such as the conveyor module 10a) of a plurality of conveyor modules 10, but the scanner 34 may be placed at another point along the path of the plurality of conveyor modules 10. In one embodiment, the scanner 34 is triggered to scan the indicia on the package 24 by the entry-end sensor 18 of a first longitudinal conveyor module 10a. Additional scanners 34 may also be placed along the path of the plurality of conveyor modules 10 and/or at endpoints of the path to provide additional tracking and/or confirmation of a given package's path and final disposition.

The conveyance system 32 further comprises a controller 38 (shown schematically in FIGS. 6-10) such as a computing device and is operable to control movements of the conveyor modules 10 independently of one another. The controller 38 communicates with the scanner 34, first-end sensor 18, second-end sensor 20 and drive rollers 14 to control the operation of the conveyor modules 10 of the conveyance system 32. The controller 38 is provided with sorting data or destination data for each package 24 that indicates a particular sorting location or endpoint 30 to which the package 24 is to be directed. The controller 38 receives identifying information for each package 24 from the scanner 34 and may thus cross-reference the identifying information with the sorting data to determine an appropriate path and/or endpoint 30 for the package 24 through the plurality of conveyor modules 10.

For example, as depicted in FIG. 2, at position A, the package 24 may be on a common conveyance system known in the art or might be handled by other automation, robotics, or manually transferred onto the conveyor module 10a. This movement of the package 24 breaks or interrupts the beam or signal 21 of the first end or entry-end sensor 18 which is detected by or communicated to the controller 38. The controller 38 energizes drive roller 14 of the conveyor module 10*a* to move the belt 12 and thus the package 24 positioned on an upper run 25 thereof from the entry end 26 toward a middle of the conveyor module 10*a* generally corresponding to the package 24 shown in position B of FIG. 2. Indicia on the package 24 may be scanned by the scanner 34 at position B. Upon complete entry of the package 24 onto the belt 12, the entry-end sensor signal 21 is restored informing the controller 38 that the package 24 is fully disposed on the belt 12.

The controller 38 communicates with the sensors 18 and 20 to track the location of each package 24 through the conveyance system 32. Based upon the breaking and restoration of signals 21 from the sensors 18 and 20 and the known location of the sensors 18 and 20, the relative position of each scanned package 24 is determined and tracked by the controller. Other trackable operations of the conveyance system 32 such as the direction of rotation of the drive rollers 14 may also be used to track the location of the packages 24 on the conveyor system 32. When the controller 38 determines that a package 24 is not present on a conveyor module 10 in the conveyance system 32, the controller 38 operates the drive roller 14 of the one or more conveyor modules 10 feeding to the open conveyor module 10 to advance a package 24 to the open conveyor module 10.

Returning to FIG. 2, after package 24 is advanced to position B, if the controller determines that a package 24 is not positioned on conveyor 10*b*, the controller 38 activates drive roller 14 of conveyor 10*a* to accelerate the drive belt to advance the package 24 toward position C on the adjacent open conveyor module 10*b*. Interruption of and then restoration of the beam 21 of second end sensor 20 as the package 24 advances from position B past the beam 21, informs the controller 38 that the package 24 should have advanced to position C on the next conveyor module 10*b*. The acceleration of the belt 12 and the package 24 supported on the upper run 25 thereof provides inertial energy to fully transfer the package 24 onto the subsequent conveyor module 10*b*. Restoration of the beam 21 after the trailing edge of the package 24 advances past the beam 21 causes the controller to stop rotation of the drive roller 14 and belt 12 after a preset time calculated to allow clearance of the package 24 past the second end 28 of the conveyor module 10*a*.

Once the controller 38 verifies that a package 24 has advanced from position B to position C through interruption and restoration of beam 21 of sensor 20, another package is advanced from position A to position B on the first conveyor module 10*a*. When the package 24 advanced to position C on conveyor 10*b* is subsequently advanced to position D or E as verified by interruption and restoration of beam 21 of sensor 18 or 20, the controller 38 re-energizes drive roller 14 of conveyor module 10*a* to advance the upper run 25 of conveyor belt 12 toward the second end 28 of conveyor module 10 and to advance the package 24 thereon from position B and across the belt 12 of adjacent conveyor module 10*b* to position C. This process may be repeated for additional conveyor modules 10 configured together such as shown in FIGS. 4-10.

The rotational velocity of the drive roller 14 and linear velocity of the belt 12 may be increased suddenly, linearly, parabolically, or based on another function and such acceleration may be initiated at position B or at another position along the length of the belt 12. In some applications, the shape or nature of the packages 24 may be such that a leading edge of the package 24 may cross the beam 21 of sensor 20 proximate the second end 28 of the conveyor module 10*a* before belt 12 of conveyor module 10*a* and the package 24 stop. The exit-end or second-end sensor 20 may be spaced inward from the exit end 28 of the belt 12 to provide a sufficient distance for acceleration of the package 24 from position B2 to the exit end 28 of the conveyor module 10*a* to attain enough inertia to advance to the package 24 to position C generally at the center of the adjacent conveyor 10*b* after advancing off the end of the belt 12 of conveyor module 10*a*. Restoration of the beam or signal 21 of the second-end sensor 20, confirming the package 24 has been advanced to the second end 28 of conveyor 10*a* and past beam 21, causes the controller to decrease or stop the rotational velocity of the drive roller 14 and linear velocity of the belt 12 of the conveyor module 10*a* after a specified time (which may be immediately) calculated to ensure that the package 24 advances onto conveyor 10*b* and preferably to position C.

Transference of the package 24 onto the next conveyor module 10*b* may also be aided by elevation of the exit end 28 of the conveyor module 10*a* above the belt 12 of the conveyor module 10*b*, as shown in FIG. 13 and discussed above. Such elevation may delay contact between the package 24 and the belt 12 of the conveyor module 10*b* and thus reduce friction forces therebetween until the package 24 is sufficiently advanced above and across the conveyor module 10*b* to position C near the center of the belt 12. Contact between the package 24 and the conveyor module 10*b* may not occur until the center of gravity of the package 24 passes sufficiently beyond the exit end 28 of the conveyor module 10*a* to cause the package to pivot, via gravity, about the exit end 28 of the conveyor module 10*a*. This may prevent or reduce a likelihood of the package 24 becoming stuck or hung partially on both the conveyor module 10*a* and the conveyor module 10*b*. In some embodiments, elevation of the conveyor module 10*a* relative to the conveyor module 10*b* and acceleration of the package 24 may at least partially throw or launch the package 24 onto the conveyor module 24, e.g., the package 24 may be at least partially or momentarily airborne.

Upon transference from the conveyor module 10*a* to the conveyor module 10*b* and thus to position C, the controller functions to direct the package 24 to the desired sort location at position D or position E as dictated by the sorting data. The controller thus energizes the driver roller 14 of the conveyor module 10*b* to move the belt 12 toward position D or position E as required. Transference of the package 24 to position D is detected by the controller based on signals from the first-end sensor 18 or to position E based on signals from the second-end sensor 20. Once the controller 38 confirms transference of the package 24 to position D or position E, the controller energizes the drive roller 14 of conveyor module 10*a* to direct the next package onto conveyor module 10*b* either promptly or once the controller confirms that another package 24 has advanced onto conveyor 10*a* through interruption and restoration of beam 21 of first-end sensor 18 of conveyor 10*a*.

As depicted in FIG. 3, the configuration shown in FIG. 2 may be extrapolated to a variety of configurations in which positions D and E may be endpoints 30 or may be on a subsequent conveyor module 10 which can be operated by the controller to further move the package 24 toward a final endpoint 30 which In FIG. 3 are labeled endpoints 30-1 through 30-4 representing four endpoints or sort locations. Like FIG. 2, FIG. 3 depicts a first conveyor module 10*c* on which a package may be received and moved to a subsequent conveyor module 10*d*. From the conveyor module 10*d*, the package may be moved to a first sort location or endpoint 30-1 or to another subsequent conveyor module 10*e*. The package 24 can then be moved to a second sort location/endpoint 30-2 or onto a fourth conveyor module 10*f*. The fourth conveyor module 10*f* provides movement of the package 24 to either a third sort location/endpoint 30-3 or a fourth sort location/endpoint 30-4. This configuration can be further extrapolated as shown in FIGS. 6-10 to provide any number of endpoints 30. In a preferred embodiment, the controller will direct packages 24 that do not have a determinable endpoint 30 to a final endpoint 37 which may be referred to as a catch-all or jackpot endpoint 37 for conveyed parcels not indicated to have a determinable endpoint.

Figure 7:
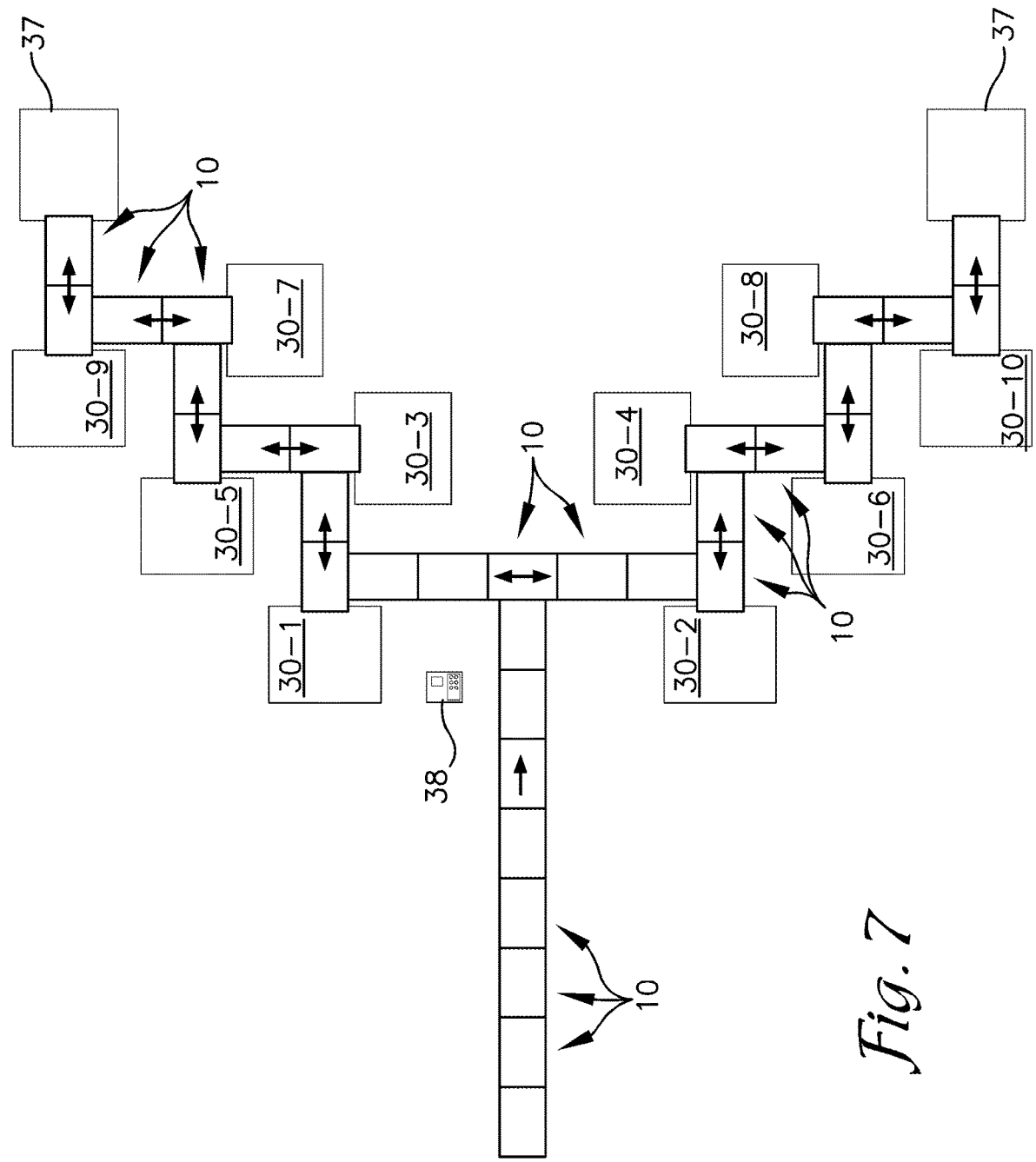
FIG. 7 is a schematic, plan view of an implementation of the conveyor modules of FIG. 1 providing twelve large sorting locations depicted in accordance with an exemplary embodiment.
Figure 8:
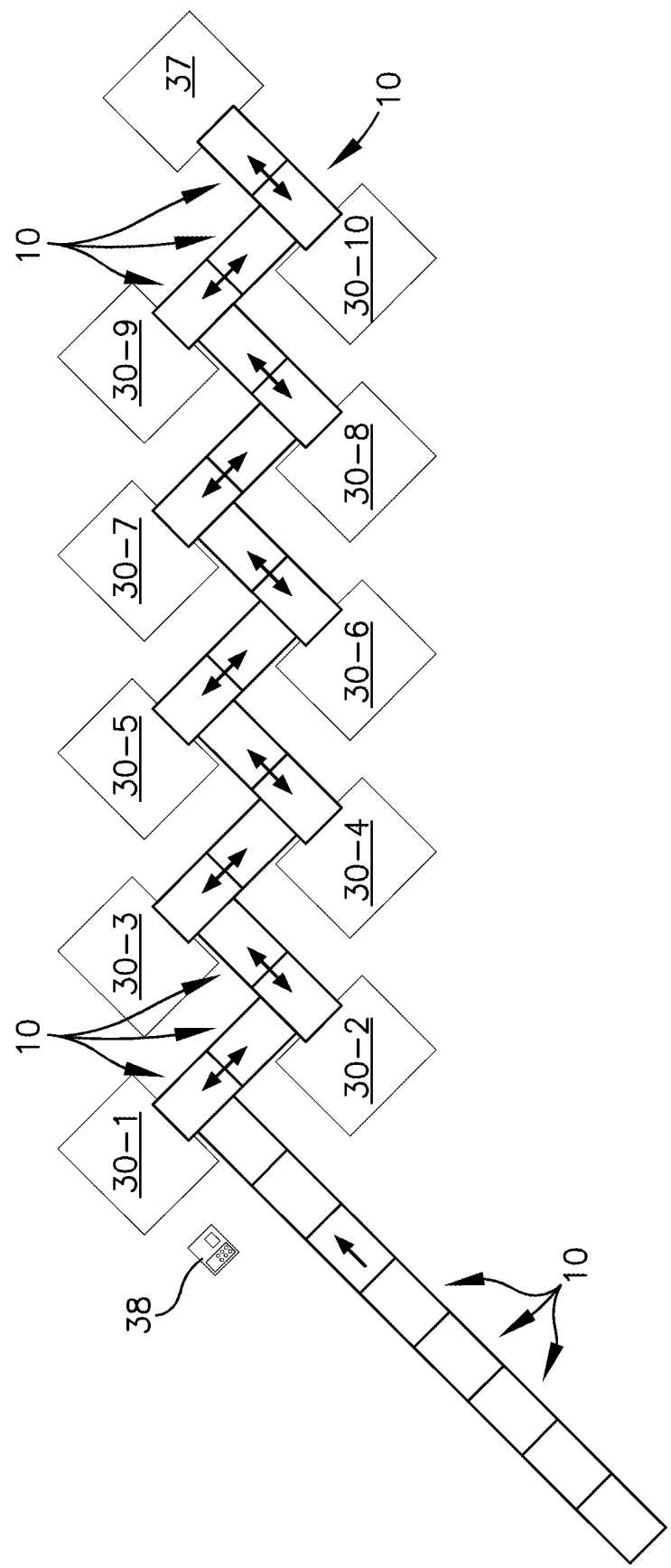
FIG. 8 is a schematic, plan view of another implementation of the conveyor modules of FIG. 1 providing twelve large sorting locations depicted in accordance with an exemplary embodiment.
Figure 9:
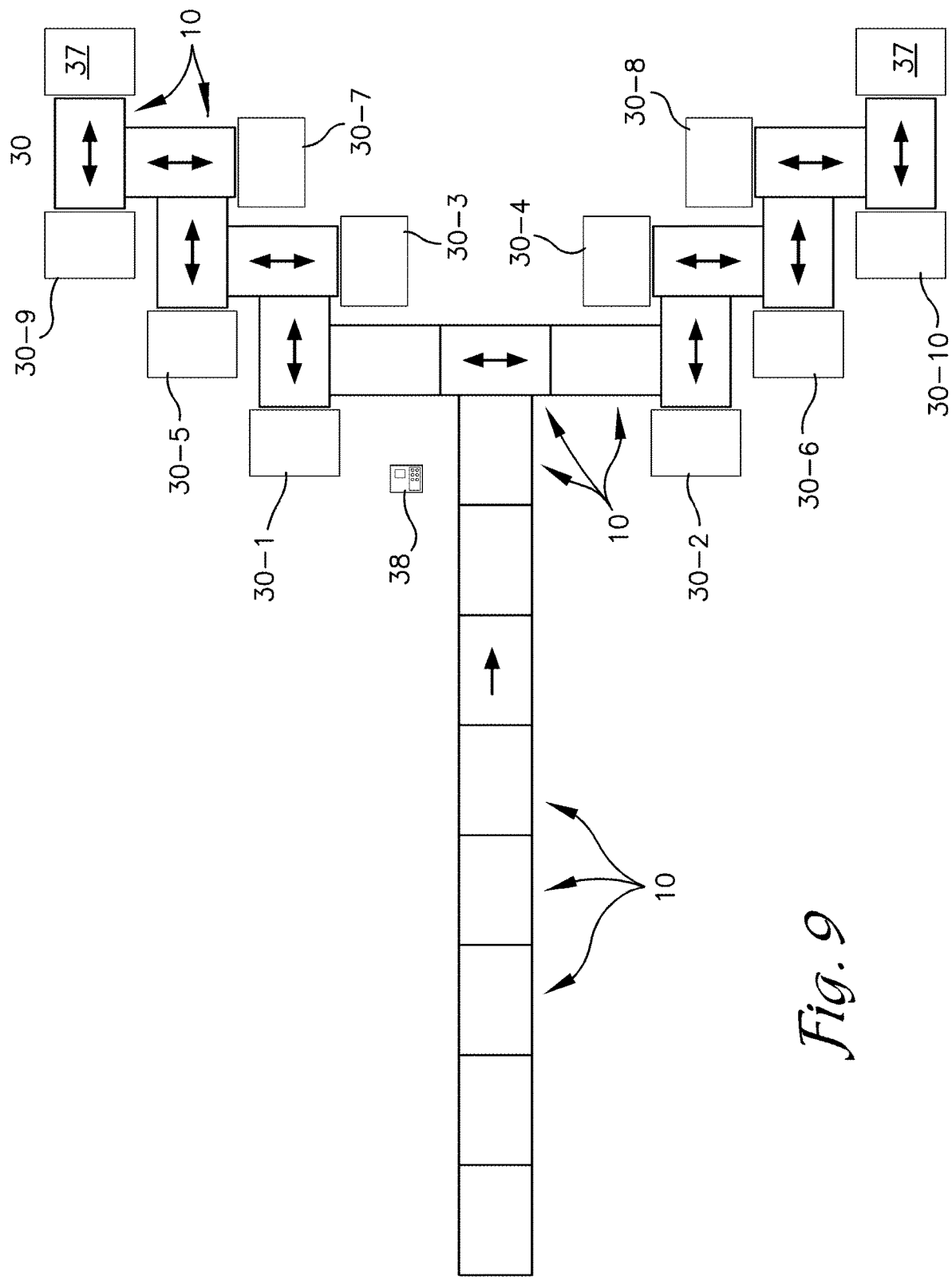
FIG. 9 is a schematic, plan view of an implementation of the conveyor modules of FIG. 1 providing twelve tote-sized sorting locations depicted in accordance with an exemplary embodiment.
Figure 10:
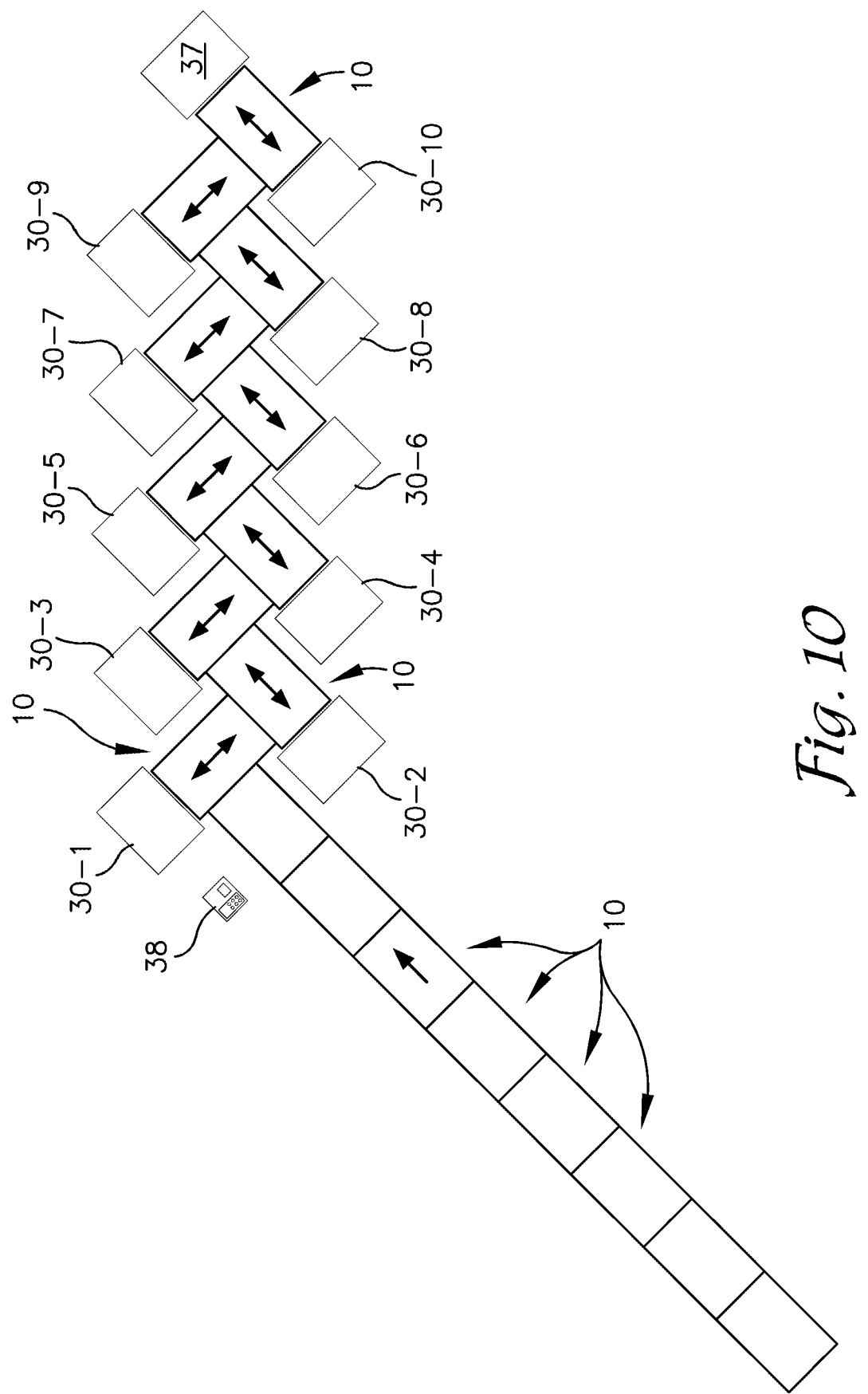
FIG. 10 is a schematic, plan view of another implementation of the conveyor modules of FIG. 1 providing twelve tote-sized sorting locations depicted in accordance with an exemplary embodiment.

Additionally, as depicted in FIGS. 6-8, multiple conveyor modules 10 may be longitudinally aligned to provide greater distances between endpoints 30. This may allow tailoring conveyance system 32 formed by the conveyor modules 10 to accommodate and adapt to a variety of receiving containers or subsequent package handling systems. For example, conveyance systems like that depicted in FIGS. 9 and 10 may employ totes or bins to collect packages 24 at each endpoint 30 while the conveyance systems shown in FIGS. 6-8 may employ larger, pallet-based bins such as those commonly referred to in the art as Gaylord bins or boxes. Such tailoring may be accomplished while maintaining the conveyor modules 10 in a standardized configuration and dimensions.

The conveyance system 32 formed from a plurality of conveyor modules 10 enables the controller 38 to track each package based on its location on a particular conveyor module 10. The controller can also stage packages 24, space packages 24 apart, and redirect packages 24, among other operations through independent control of each of the conveyor modules 10.

With reference now to FIGS. 15-18, a package-sorter 100 is depicted in accordance with an exemplary embodiment. The package-sorter 100 may be configured for placement at endpoints 30 of the conveyance system 32 to receive packages 24 from the conveyor modules 10. The package-sorter 100 comprises a pair of vertically extending sidewalls 102 with a pair of tote-support panels including upper support panel 104 and lower support panel 105 extending therebetween. The upper and lower tote-support panels 104 and 105 are each sized and positioned to receive a collection tote 106 thereon. The upper and lower tote-support panels 104 and 105 are configured to retain the collection totes 106 in a vertically stacked and spaced apart relation to allow packages 24 to be deposited into an open top thereof. The collection totes 106 may comprise custom or available open-topped containers such as a tote, basket, bucket, or the like formed from a plastic, metal, cardboard, or the like and is sized to receive a plurality of packages 24 from the conveyance system 32.

The sidewalls 102 space the tote-support panels 104 and 105 away from the conveyor module 10 a distance sufficient to enable the package 24 to reliably pass between the tote-support panels 104 and the conveyor module 10 and/or a rear wall (not shown) of the package-sorter 100. A stationary deflection panel 108 is disposed to extend between the sidewalls 102 and is positioned on an angle extending from near a top edge of the collection tote 106L disposed on the lower of the tote-support panels 104L toward a rear edge 110 of the sidewalls 102 that is nearest to the conveyor module 10. The deflection panel 108 is configured to direct packages 24 falling from the conveyor module 10 into the lower collection tote 106. The packages 24 may fall by gravity into contact with the deflection panel 108 and then slide into the lower collection tote 106.

A pivotable diversion panel 112 is pivotably coupled to a support 114 near a top edge of an upper collection tote 106 disposed on the upper tote-support panel 104. The diversion panel 112 is pivotable about the coupling between a generally vertical bypass position (FIG. 17) and an upwardly angled receiving position (FIG. 18). An actuator (not shown) is coupled with the diversion panel 112 to pivot the panel 112 between the bypass position and the receiving position. In the bypass position, the diversion panel 112 is pivoted upwardly and out of the path of packages 24 leaving the conveyor module 10 to enable the packages 24 to fall past the diversion panel 112 and the upper collection tote 106 and onto the deflection panel 108 for collection in the lower collection tote 106. In the receiving position, the diversion panel 112 is pivoted down from the bypass position to an upwardly angled position similar to or parallel to that of the deflection panel 108 to extend between an upper edge of the upper collection tote 106 and the rear edge 110 of the sidewalls 102. In the receiving position, a top edge of the diversion panel 112 is positioned adjacent to or below a terminal end of the associated conveyor module 10 such that packages 24 leaving the conveyor module 10 are moved onto or fall from the conveyor module 10 onto the diversion panel 112 and can slide or be directed into the upper collection tote 106 via gravity.

The package-sorter 100 may be positioned at any of the endpoints 30 of the conveyance system 32 to provide collection of packages 24 exiting therefrom. Actuation of the diversion panel 112 may be controlled by the controller to provide additional sorting of the packages 24 exiting the conveyance system 32 at a given endpoint, i.e., the endpoint 30 can be further divided into two subsequent endpoints for the packages 24. The diversion panel 112 may also be operated to increase capacity at the endpoint 30. For example, as the lower collection tote 106 becomes full, the diversion panel 112 may be actuated to the receiving position to divert the packages 24 to the upper collection tote 106 and an operator alerted that the lower collection tote 106 should be emptied or replaced.

In another embodiment, additional tote-support panels 104 and diversion panels 112 may be provided to accommodate additional collection totes 106 and the diversion panels 112 selectively actuated to direct packages 24 into the desired collection tote 106.

Many different arrangements of the various components depicted, as well as components not shown, are possible without departing from the scope of the description provided herein. Exemplary embodiments have been described with the intent to be illustrative rather than restrictive. Alternative embodiments will become apparent to readers of this disclosure after and because of reading it. Alternative means of implementing the aforementioned can be completed without departing from the scope of exemplary embodiments described herein. Identification of structures as being configured to perform a particular function in this disclosure is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of exemplary embodiments described herein.

What is claimed and desired to be secured by Letters Patent is as follows:

1. A modular conveyor system for conveying and sorting a plurality of packages, comprising:
   a plurality of conveyor modules comprising at least first and second conveyor modules wherein said second conveyor module extends adjacent and orthogonally relative to a second end of the first conveyor module, wherein each of the plurality of conveyor modules comprises:
      a belt extending around a drive roller and a driven roller, an upper run of the belt selectively advanceable by the drive roller toward a first end or a second end of the conveyor module, and the upper run of the belt adjustably positionable vertically relative to a horizontal surface or at an upwardly sloped angle relative to a first end of the conveyor module;
      a drive means for driving a roller coupled to the drive roller and operable to rotate the drive roller in either direction;
      a first presence sensor positioned proximate the first end of the conveyor module and a second presence sensor positioned proximate a second end of the conveyor module; and
      a controller in communication with the first presence sensor and the second presence sensor of each of the plurality of conveyor modules, the controller programmed to cause the drive means of the first conveyor module to rotate the drive roller to advance a package on the belt of the first conveyor module onto the belt of the second conveyor module after the controller determines that a package supported on the belt of the second conveyor module has advanced off of the belt past the first presence sensor or the second presence sensor.

2. The modular conveyor system of claim 1, wherein each of the plurality of conveyor modules is sized to accommodate one package at any one time.

3. The modular conveyor system of claim 1, wherein the upper run of the belt of the first conveyor module is adjustably positionable to slope upward from the first end to the second end of the first conveyor module relative to a horizontal plane.

4. The modular conveyor system as in claim 3, wherein an upper run of the belt of the first conveyor module at the second end thereof extends above an adjacent portion of the upper run of the belt of the second conveyor module.

5. The modular conveyor system as in claim 1, wherein an upper run of the belt of the first conveyor module at the second end thereof extends above an adjacent portion of the upper run of the belt of the second conveyor module.

6. The modular conveyor system of claim 1 including a plurality of endpoints and further comprising at least one identification detection device positioned to scan or read indicia on a package advanced onto the belt of the first conveyor module, wherein the at least one identification detection device is in communication with the controller having sorting data, the controller comparing the indica information from the at least one identification detection device to the sorting data and the controller calculating a corresponding endpoint of the plurality of endpoints where the conveyed package will be routed.

7. The modular conveyor system of claim 6, further comprising at least one package sorting apparatus system located at at least one of the plurality of endpoints and in communication with the controller.

8. A conveyance system, comprising:
   a plurality of conveyor modules comprising at least first and second conveyor modules wherein said second conveyor module extends adjacent and orthogonally relative to a second end of the first conveyor module, each of the plurality of conveyor modules comprises a bidirectional conveyor selectively operable to advance a package supported thereon toward either a first end or a second end of the bidirectional conveyor, a second end of the bidirectional conveyor of the first conveyor module extends vertically above an adjacent side of the second conveyor module;
   a first presence sensor positioned relative to the first end of each of the first and second conveyor modules and a second presence sensor positioned relative to a second end of each of the first and second conveyor modules,
   wherein an interruption or a restoration of a signal of at least one of the first and second presence sensors on the second conveyor module causes acceleration of the bidirectional conveyor of the first conveyor module to advance a package supported thereon onto the second conveyor module.

9. The conveyance system of claim 8, wherein each of the plurality of conveyor modules accommodates one package per conveyor module at any one time.

10. The conveyance system of claim 8, wherein the bidirectional conveyor of each of the plurality of conveyor modules extends upward at an angle from the first end to the second end thereof.

11. The conveyance system of claim 10 wherein the bidirectional conveyor is mounted on length adjustable legs adjustable to increase or decrease the height of the first and second ends of the bidirectional conveyor relative to a horizontal surface.

12. The conveyance system of claim 10, wherein the upwardly extending angle of the bidirectional conveyor is preferably between from at least about 0° and at most about 45° relative to horizontal.

13. The conveyance system of claim 8, further comprising a controller in communication with the first and second presence sensors and the bidirectional conveyor of each of the plurality of conveyor modules, wherein, when the restoration of the signal of the second presence sensor on any of the plurality of conveyor modules is communicated to the controller, the controller causes a cessation of rotation of the bidirectional drive conveyor on the respective one of the conveyor modules and when the restoration of the signal of one of the first presence sensors or the second presence sensors on one of the plurality of conveyor modules is communicated to the controller, the controller causes an increase in the acceleration of the bidirectional conveyor of an immediately preceding conveyor module of the plurality of conveyor models.

14. The modular conveyor system of claim 13 including a plurality of endpoints and further comprising at least one identification detection device positioned to scan or read indicia on a package advanced onto the first conveyor module, wherein the at least one identification detection device is in communication with the controller having sorting data, the controller comparing the indica information from the at least one identification detection device to the sorting data and the controller calculating a corresponding endpoint of the plurality of endpoints where a package will be routed.

15. The conveyance system of claim 14, further comprising at least one package-sorter system in communication with the controller, located at at least one of the plurality of endpoints, having a plurality of vertically aligned and spaced apart package collection containers with at least one package directing panel in communication with the controller.

16. The conveyance system of claim 13, further comprising at least one identification detection device in communication with the controller provided with sorting data, the at least one identification detection device positioned to scan indicia of a conveyed package.

17. The conveyance system of claim 15, wherein the controller compares the sorting data with the indicia of the conveyed parcel and controls a direction of conveyance of the bidirectional conveyor of each of the plurality of conveyor modules, routing the conveyed parcel to one of the plurality of endpoints indicated by the sorting data.

18. A method for sorting parcels on a conveyance system for delivery to selected locations, comprising:

arranging a plurality of conveyor modules including bidirectional conveyors such that the bidirectional conveyors of at least some of the conveyor modules are oriented transversely relative to bidirectional conveyors of other conveyor modules of the plurality of conveyor modules to form a conveyance system having a plurality of endpoints corresponding to destination indicia;

successively advancing a plurality of parcels having destination indicia thereon individually onto a first conveyor module of the conveyance system;

scanning the destination indicia on each parcel advanced onto the first conveyor module;

successively advancing each parcel from the first conveyor module to successively adjacent conveyor modules until the parcel reaches a designated endpoint corresponding to the destination indicia on the respective parcel or an endpoint corresponding to none of the destination indicia on the plurality of parcels, wherein as one of the parcels of the plurality of parcels is advanced off of a downstream conveyor module another parcel of the plurality of parcels on a prior adjacent conveyor module is advanced onto the downstream conveyor module, each of the plurality of conveyor modules accommodating one of the plurality of parcels at any one time.

19. The method of sorting parcels on a conveyance system as in claim 18 wherein the step of arranging a plurality of conveyor modules includes positioning an end of a first bidirectional conveyor higher than an adjacent portion of an adjacent second bidirectional conveyor such that a parcel advanced from the first bidirectional conveyor onto the adjacent second bidirectional conveyor advances in spaced relation over the adjacent portion of the second bidirectional conveyor.

* * * * *